US011969086B2

(12) United States Patent
Christensen et al.

(10) Patent No.: US 11,969,086 B2
(45) Date of Patent: Apr. 30, 2024

(54) ADJUSTABLE PLATFORM WORK TRAY

(71) Applicants: Gary A. Christensen, Buckeye, AZ (US); James Michael Hainline, Jr., Surprise, AZ (US)

(72) Inventors: Gary A. Christensen, Buckeye, AZ (US); James Michael Hainline, Jr., Surprise, AZ (US)

( * ) Notice: Subject to any disclaimer, the term of this patent is extended or adjusted under 35 U.S.C. 154(b) by 106 days.

(21) Appl. No.: 17/715,697

(22) Filed: Apr. 7, 2022

(65) Prior Publication Data

US 2023/0106905 A1 Apr. 6, 2023

Related U.S. Application Data

(63) Continuation-in-part of application No. 29/824,896, filed on Jan. 27, 2022, now Pat. No. Des. 991,775.

(60) Provisional application No. 63/251,804, filed on Oct. 4, 2021.

(51) Int. Cl.
*A47B 5/02* (2006.01)
*B25H 3/06* (2006.01)

(52) U.S. Cl.
CPC ................. *A47B 5/02* (2013.01); *B25H 3/06* (2013.01); *A47B 2200/0036* (2013.01)

(58) Field of Classification Search
CPC ... A47B 5/02; A47B 2200/0036; A47B 37/04; A47B 23/02; B25H 3/06; E06C 7/14; E06C 7/16
USPC .......................................................... 108/152
See application file for complete search history.

(56) References Cited

U.S. PATENT DOCUMENTS

| | | | | | |
|---|---|---|---|---|---|
| 762,658 | A | * | 6/1904 | Rouze | E06C 7/16 248/238 |
| 1,104,996 | A | * | 7/1914 | McHale | E06C 7/16 248/238 |
| 1,701,347 | A | * | 2/1929 | Wardle | E06C 7/16 248/238 |
| 2,174,891 | A | * | 10/1939 | Maran | E06C 7/16 248/210 |
| 2,439,185 | A | * | 4/1948 | Patt | E06C 7/16 248/210 |

(Continued)

OTHER PUBLICATIONS

Ballymore Tool Tray, Retrieved from Internet, Retrieved on Jun. 14, 2021 <URL https://www.grainger.com/product/BALLYMORE-Tool-Tray-9WL35>.

*Primary Examiner* — Daniel J Troy
*Assistant Examiner* — Timothy M Ayres

(57) ABSTRACT

An adjustable platform work tray includes a storage platform, a fixed mounting channel, an adjustable mounting channel, a support frame, and an adjustable brace. The storage platform that function as the storage area for materials and tools includes a base and a side wall. The fixed mounting channel is laterally mounted along a first wall section of the side wall and functions as one of the mounting structures. The support frame is perpendicularly mounted to the base and oriented opposite of the side wall. The support frame is positioned adjacent to the first wall section as the adjustable mounting channel is slidably mounted to the support frame. The adjustable mounting channel that functions as the second structure and the fixed mounting channel are positioned coplanar to each other. The adjustable brace is rotatably engaged in between the base and the adjustable mounting channel to further support the storage platform.

13 Claims, 5 Drawing Sheets

(56) References Cited

U.S. PATENT DOCUMENTS

| | | | | | |
|---|---|---|---|---|---|
| 2,536,731 | A * | 1/1951 | Douglas | A47K 3/074 | 5/2.1 |
| 3,050,355 | A * | 8/1962 | Hess | B60N 3/004 | 108/146 |
| 4,357,881 | A * | 11/1982 | De Long | A47B 23/02 | 211/88.01 |
| 5,158,023 | A * | 10/1992 | Allen | E04G 5/00 | 182/120 |
| 5,544,718 | A | 8/1996 | Schumacher | | |
| 5,685,468 | A | 11/1997 | Hernandez | | |
| 6,076,937 | A | 6/2000 | Wood | | |
| 6,931,998 | B1 * | 8/2005 | Leese | A47B 23/02 | 108/42 |
| 8,857,347 | B1 * | 10/2014 | Liu | A47B 5/02 | 108/47 |
| 9,357,839 | B1 * | 6/2016 | Liu | A47B 5/02 | |
| 9,814,305 | B2 * | 11/2017 | Brus | A47G 7/044 | |
| 10,718,120 | B1 * | 7/2020 | Haney | E04G 5/003 | |
| 11,015,391 | B1 * | 5/2021 | Kanaan | A47C 4/022 | |
| 2007/0089931 | A1 | 4/2007 | Hunt | | |
| 2017/0014989 | A1 | 1/2017 | McGee | | |

* cited by examiner

ADJUSTABLE PLATFORM WORK TRAY

The current application claims a priority to the U.S. Provisional Patent application Ser. No. 63/251,804 filed on Oct. 4, 2021.

FIELD OF THE INVENTION

The present invention relates generally to a work tray. More specifically, the present invention is designed to easily and securely mount on all makes and models of platform lifts thus making it possible to safely store any relevant items or tools.

BACKGROUND OF THE INVENTION

In the construction industry, one of the most valuable types of equipment is a platform lift, also known as a man lift. The platform lift is a mechanical device that is used to provide temporary access for people or equipment to inaccessible areas, usually at height. There are different types of platform lifts such as scissor lifts, boom lifts, and articulating lifts, etc. Even though the platform lifts are useful to reach higher elevations, the platform lifts lack a designated storage area of necessary materials or tools that workers may require. As a result, workers generally place necessary materials or tools on the floor of the platform lift or on a tool belt. When items are stored within the floor of the platform lift, those items can be accidently be dropped or tripped on by the workers thus creating a hazard work environment. Due to the limited amount of storage space of the tool belts, the workers may not be able to store all of the necessary items that are required thus creating an inefficient workflow.

An objective of the present invention is to provide an adjustable platform work tray to store necessary materials and tools to improve work efficiency and safety. The present invention enables the workers to work safely and access the necessary materials and tools. The present invention can also be easily mounted on any type of elevating work platform or safety rail. depending upon the mounting structure, the present invention can easily be adjusted thus providing flat storage area. As a result, the present invention provides a novel work tray that can be mounted to the platform lift which in return improves the safety of the works and efficiency of the workflow.

DETAIL DESCRIPTIONS OF THE INVENTION

Figure 1:
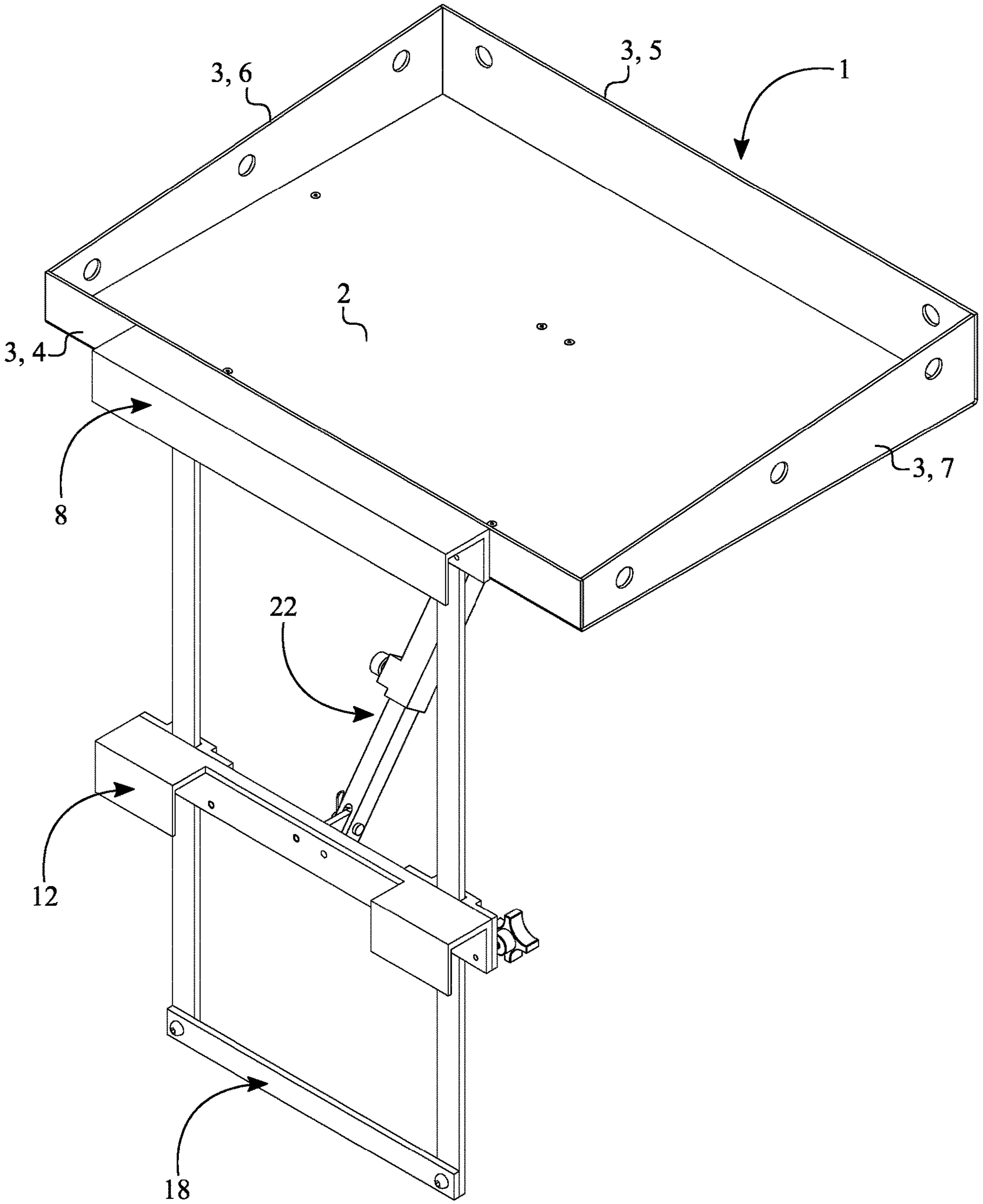
FIG. 1 is a top rear perspective view of the present invention.

All illustrations of the drawings are for the purpose of describing selected versions of the present invention and are not intended to limit the scope of the present invention.

The present invention is an adjustable platform work tray that can be mounted to any type of safety rails of the platform lift. The present invention enables the workers to store and access necessary materials and tools. Since the present invention is easily mounted on any type of elevating work platforms or safety rails, the workers are able to improve the work safety and efficiency of the workflow. In reference to FIG. 1-2, the present invention comprises a storage platform 1, a fixed mounting channel 8, an adjustable mounting channel 12, a support frame 18, and an adjustable brace 22.

Figure 2:
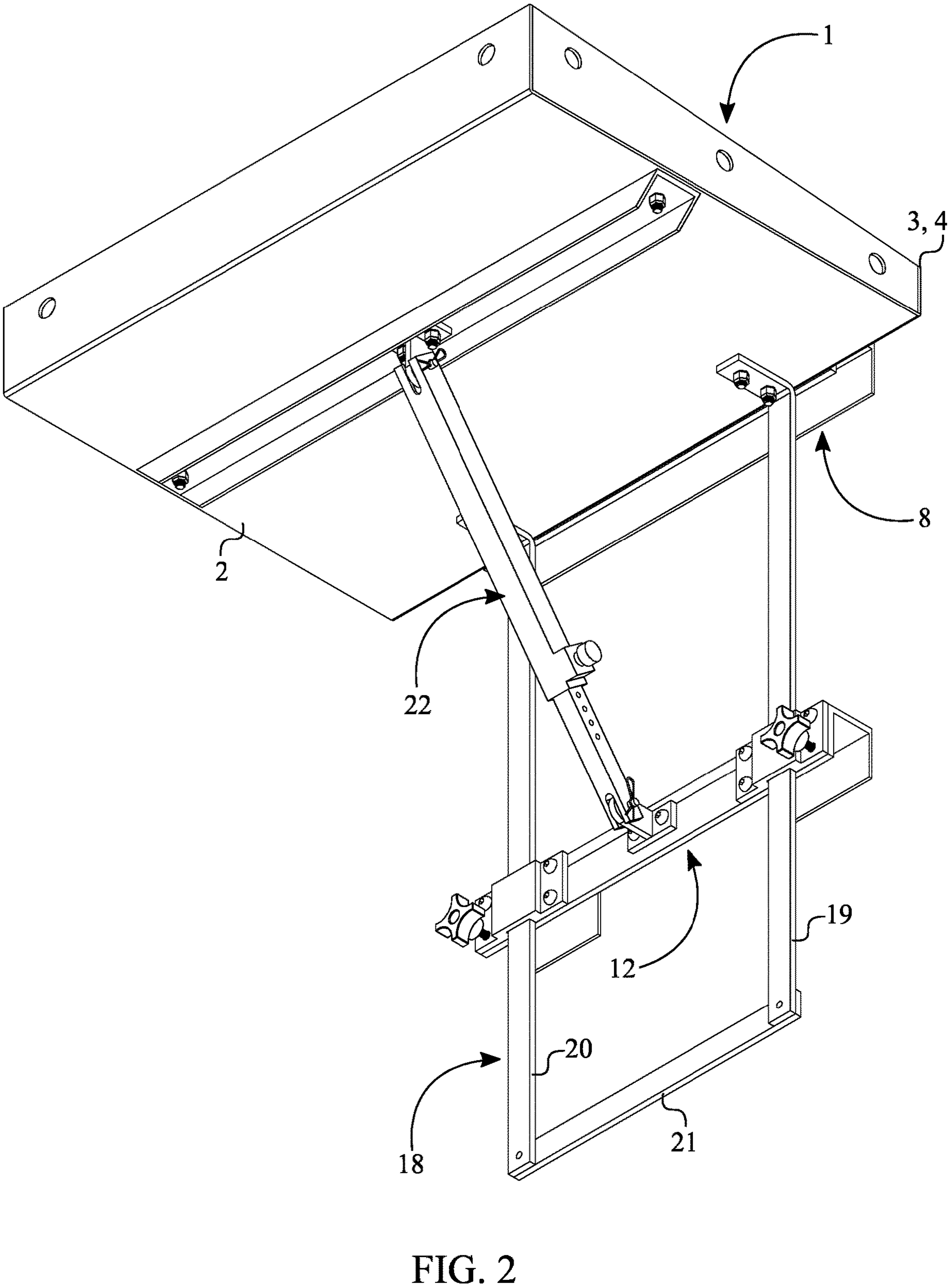
FIG. 2 is a bottom perspective view of the present invention.

In reference to the general configuration of the present invention, the storage platform 1 comprises a base 2 and a side wall 3 so that the workers can store their materials and tools. As shown in FIG. 1-2, the side wall 3 is perimetrically connected around the base 2 thus completing the general structure of the storage platform 1. The fixed mounting channel 8 is laterally mounted along a first wall section 4 of the side wall 3 and functions as one of the connection body to the safety rail of the platform lift. The support frame 18 is perpendicularly mounted to the base 2 and positioned opposite of the side wall 3. The support frame 18 is positioned adjacent to the first wall section 4 so that the adjustable mounting channel 12 can position coplanar to the fixed mounting channel 8. The adjustable mounting channel 12 is slidably mounted to the support frame 18 and functions as the other connection body to the safety rail of the platform lift. The adjustable brace 22 is rotatably engaged in between the base 2 and the adjustable mounting channel 12, wherein the adjustable brace 22 is able to adjust based on the positioning of the adjustable mounting chancel.

Figure 5:
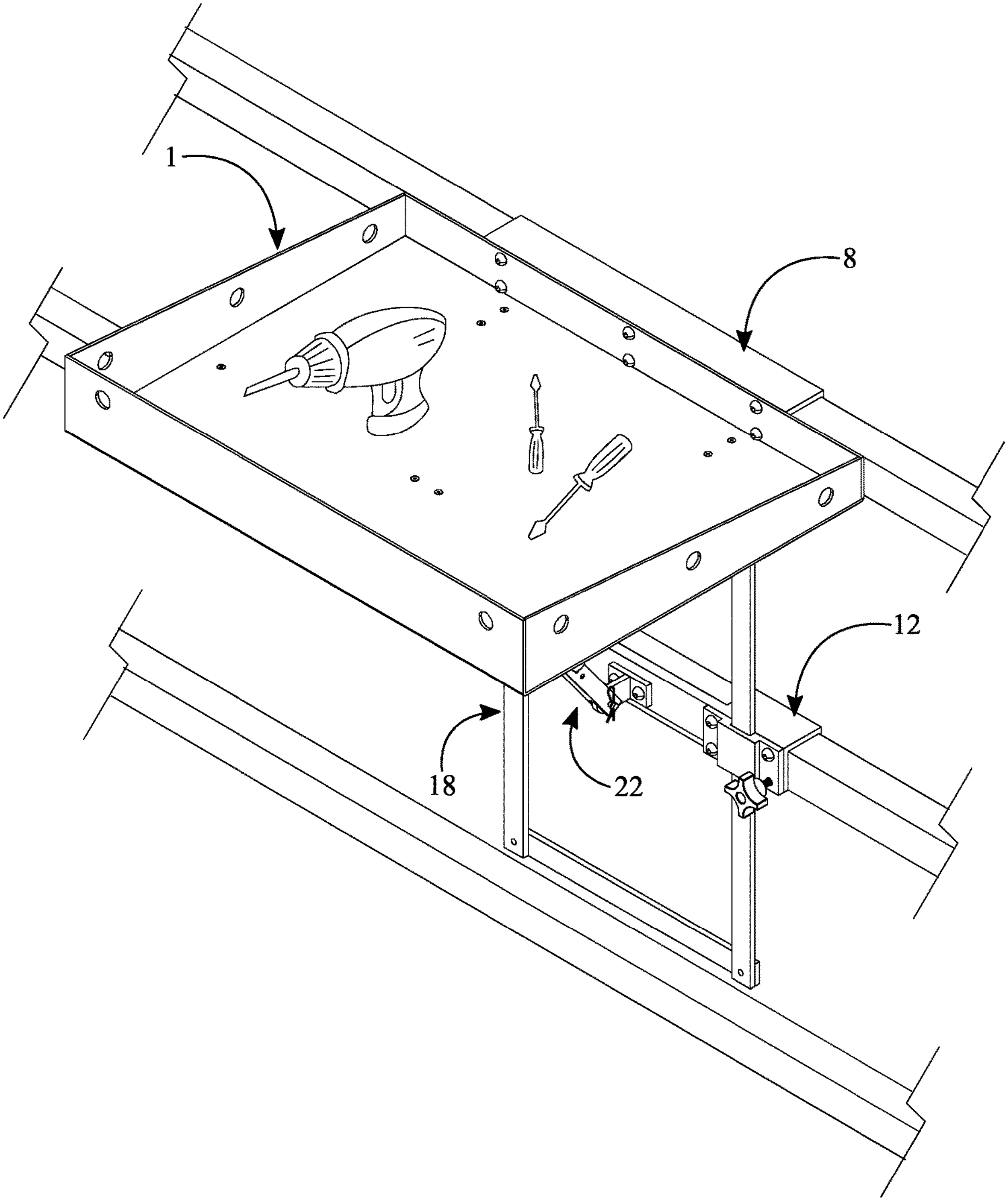
FIG. 5 is a top perspective view of the present invention, showing the attachment to the safety rail of the platform lift.

In reference to FIG. 1 and FIG. 5, the storage platform 1 is formed into a rectangular shape with a surrounding wall. More specifically, the base 2 is a flat surface area and allows the workers to store materials and tools. The side wall 3 function as the surrounding wall and further comprises a second wall section 5, a third wall section 6, and a fourth wall section 7. The first wall section 4 is perpendicularly connected to the base 2. The second wall section 5 is adjacently connected to the base 2 and oppositely positioned of the first wall section 4 about the base 2. The third wall section 6 and the fourth wall section 7 are oppositely positioned of each other about the base 2. The third wall section 6 is adjacently connected to the base 2, the first wall section 4, and the second wall section 5 in such a way that the third wall section 6 is perpendicularly positioned to the first wall section 4 and the second wall section 5. The fourth wall section 7 is adjacently connected to the base 2, the first wall section 4, and the second wall section 5 in such a way that the fourth wall section 7 is perpendicularly positioned to the first wall section 4 and the second wall section 5. The storage platform 1 further comprises a plurality of holes that traverses through the side wall 3. More specifically, the plurality of holes provides opening within the side wall 3 so that the workers can attach or hang specific equipment or tools.

The support frame 18 functions as the structural body that positions the rest of the components of the present invention. In reference to FIG. 2-4, the support frame 18 comprises a left support 19, a right support 20, and a cross support 21. The left support 19 and the first wall section 4 are oppositely oriented of each other about the base 2. The right support 20 and the first wall section 4 are oppositely oriented of each other about the base 2. In other words, the left support 19 and the right support 20 are extended downward from the base 2 while the side wall 3 is extended upward from the base 2. The left support 19 is an elongated body and terminally mounted to the base 2 of the storage platform 1. The right support 20 is an elongated body and terminally mounted to the base 2 of the storage platform 1. The cross support 21 is terminally mounted and perpendicularly positioned to the left support 19 and the right support 20. In other words, height of the left support 19 and the height of the right support 20 are equal to each other so that the cross support 21 can be terminally and perpendicularly mounted in between the left support 19 and the right support 20.

Figure 3:
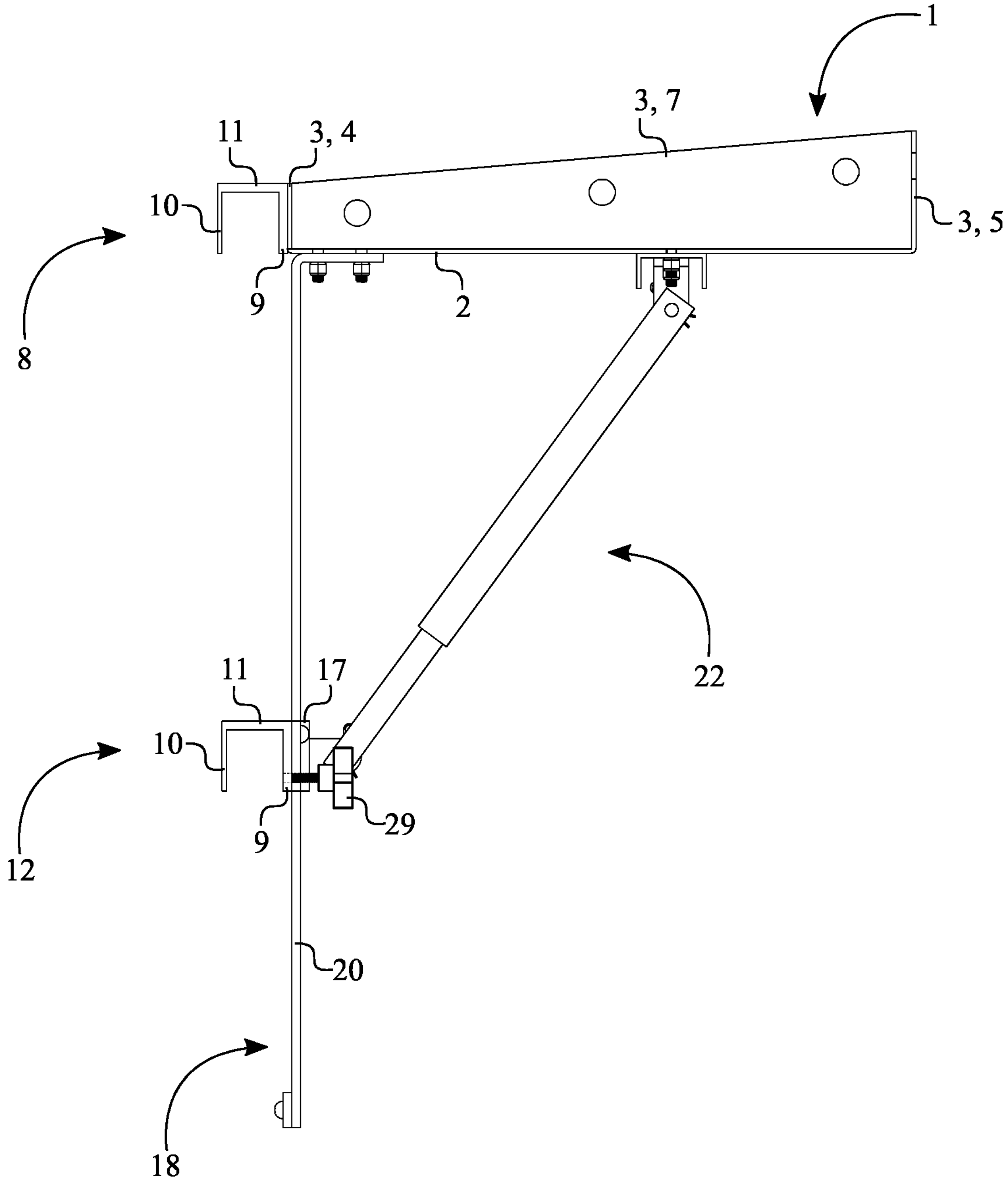
FIG. 3 is a right sideview of the present invention
Figure 4:
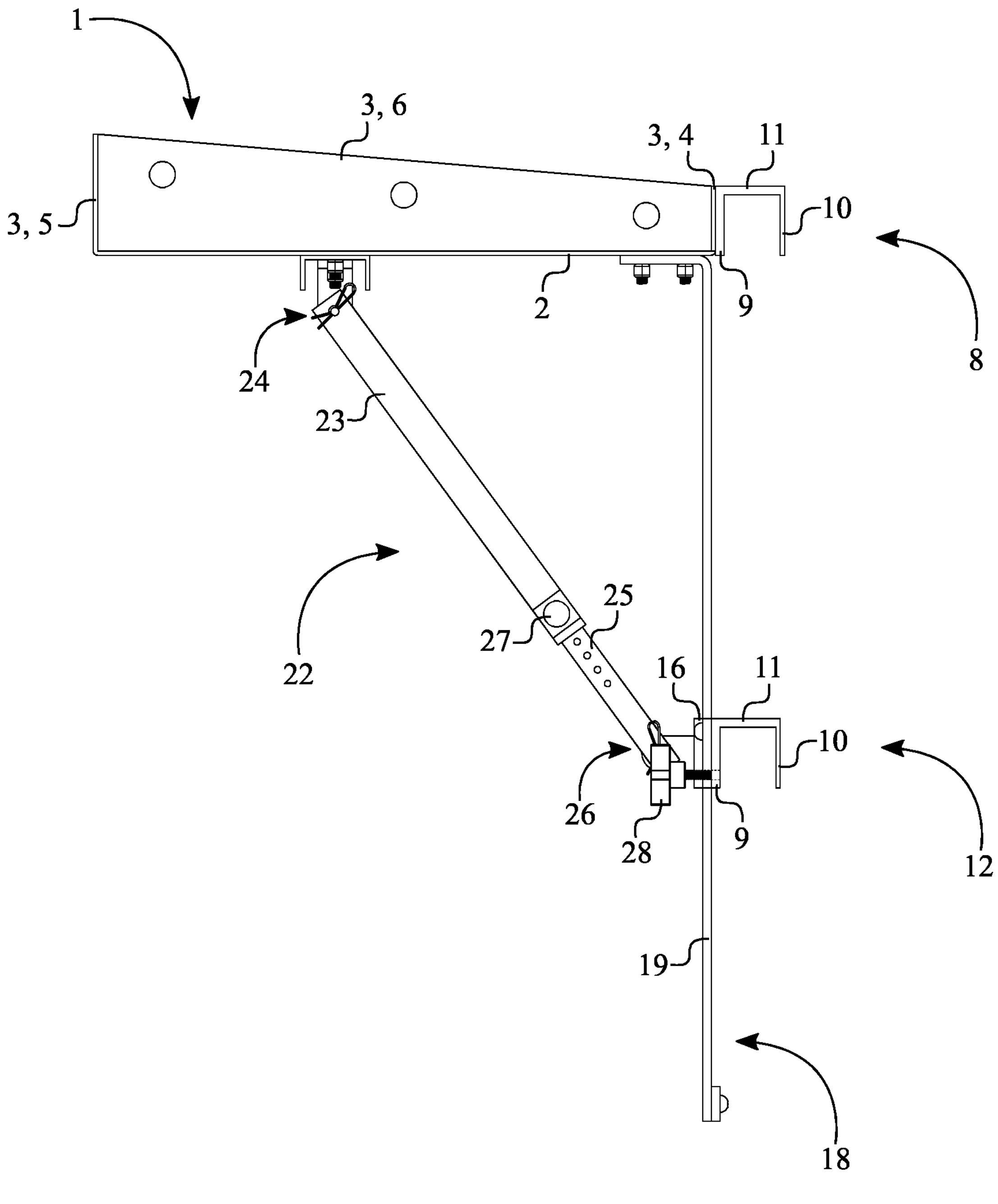
FIG. 4 is a left sideview of the present invention.

As shown in FIG. 3-4, the fixed mounting channel 8 provides a fixed mounting structure that secures the present invention to a safety rail of the platform lift. The adjustable mounting channel 12 provides an adjustable mounting structure that secures the present invention to a safety rail of the platform lift. It is essential that the adjustable mounting channel 12 is able to slide along the support frame 18 so that the workers can adjust the positioning of the adjustable mounting channel 12 according to the safety rail of the platform lift. In reference to IG. 1, the fixed mounting channel 8 and the adjustable mounting channel 12 each comprising a first channel wall 9, a second channel wall 10, and a channel base 11. More specifically, the first channel wall 9 and the second channel wall 10 are oppositely positioned of each other about the channel base 11. The first channel wall 9 is perpendicularly connected to the channel base 11. The second channel wall 10 is perpendicularly connected to the channel base 11. Collectively, the first channel wall 9, the second channel wall 10, and the channel base 11 delineate an upside down U-shaped profile for the fixed mounting channel 8 and the adjustable mounting channel 12. Due to the placement of the fixed mounting channel 8 and the adjustable mounting channel 12, the present invention is able to eliminate any rotational movement when the secured to the safety rail of the platform list.

In reference to FIG. 3-4, the first channel wall 9 of the fixed mounting channel 8 is mounted along the first wall section 4. The channel base 11 of the fixed mounting channel 8 is positioned parallel to the base 2 of the storage platform 1. More specifically, the channel base 11 of the fixed mounting channel 8 and the base 2 of the storage platform 1 are oppositely positioned of each other about the first channel wall 9 of the fixed mounting channel 8. The second channel wall 10 of the fixed mounting channel 8 is positioned offset from the first wall section 4. As a result, a channel opening of the fixed mounting channel 8 is oriented toward the cross support 21 mimicking the upside down U-shaped profile for the fixed mounting channel 8. In order to secure the present invention to the safety rail of the platform list, the fixed mounting channel 8 is simply placed over an arbitrary rail of the safety rail from top. As a result, the channel base 11 of the fixed mounting channel 8 prevents the storage platform 1 from falling down while the first channel wall 9 and the second channel wall 10 of the fixed mounting channel 8 prevent ant lateral movements of the storage platform 1.

In reference to FIG. 3-4, the adjustable mounting channel 12 further comprising a left bracket 16 and a right bracket 17. The first channel wall 9 of the adjustable mounting channel 12 is positioned adjacent to the support frame 18. The first channel wall 9 of the adjustable mounting channel 12 is slidably mounted to the left support 19 of the support frame 18 by the left bracket 16. The first channel wall 9 of the adjustable mounting channel 12 is slidably mounted to the right support 20 of the support frame 18 by the right bracket 17. Due to the placement of the left bracket 16 and the right bracket 17, the adjustable mounting channel 12 is able to slide up and down along the support frame 18. The channel base 11 of the adjustable mounting channel 12 is positioned parallel to the base 2 of the storage platform 1. More specifically, the channel base 11 of the adjustable mounting channel 12 is oriented toward the fixed mounting channel 8. The second channel wall 10 of the adjustable mounting channel 12 is positioned offset from the left bracket 16 and the right bracket 17. As a result, a channel opening of the adjustable mounting channel 12 is oriented toward the cross support 21 mimicking the upside down U-shaped profile for the adjustable mounting channel 12. In order to secure the present invention to the safety rail of the platform list, the adjustable mounting channel 12 is slidably placed over a lower rail of the safety rail from top, wherein the arbitrary rail is positioned atop the lower rail. As a result, the channel base 11 of the adjustable mounting channel 12 prevents the storage platform 1 from falling down while the first channel wall 9 and the second channel wall 10 of the adjustable mounting channel 12 prevent ant lateral movements of the storage platform 1.

The adjustable brace 22 functions as a brace cantilever so that the storage platform 1 is able to withstand a higher storage weight. Furthermore, the adjustable brace 22 is also able to adapt according to the positioning of the adjustable mounting channel 12. In reference to FIG. 4, the adjustable brace 22 comprises a tubular body 23, a retractable body 25, a locking mechanism 27. The retractable body 25 is telescopically engaged within the tubular body 23 thus allowing the retractable body 25 to slide in and out of the tubular body 23. A platform end 24 of the tubular body 23 is rotatably mounted to the base 2 of the storage platform 1 as the platform end 24 is positioned opposite of the retractable body 25. In other words, the adjustable brace 22 is able to angularly rotate with reference to the base 2 of the storage platform 1 as the adjustable mounting channel 12 moves up and down along the support frame 18. A channel end 26 of the retractable body 25 is rotatably mounted to the first channel wall 9 of the adjustable mounting channel 12 as the channel end 26 is positioned opposite of the tubular body 23. For example, when the adjustable mounting channel 12 moves towards the cross support 21, the total length of the adjustable brace 22 increases as the retractable body 25 slides outward from the tubular body 23. When the adjustable mounting channel 12 moves towards the fixed mounting channel 8, the total length of the adjustable brace 22 decreases as the retractable body 25 slides inward toward the tubular body 23. The locking mechanism 27 is externally integrated into the tubular body 23 and the retractable body 25 so that the retractable body 25 can be locked to the tubular body 23 once the desired length is achieved. Preferably, the locking mechanism 27 is a spring loaded pin and a plurality of holes. The spring loaded pin is integrated onto the tubular body 23, and the plurality of holes traverses along the retractable body 25. The workers can simply pull the spring loaded pin when the adjustable mounting brace is moved thus allowing the retractable body 25 to slide inward or outward. Once the spring loaded pin is released, the spring loaded pin engages with one of the holes from the plurality of holes thus locking the retractable body 25 to the tubular body 23.

The present invention further comprises a left hand-twist bolt 28 and a right hand-twist bolt 29 to further secure the adjustable mounting channel 12 to the safety rail of the platform lift. As shown in FIG. 3-4, the left hand-twist bolt 28 is threadedly engaged with the left bracket 16 and the first channel wall 9. The right hand-twist bolt 29 is threadedly engaged with the right bracket 17 and the first channel wall 9. When the adjustable mounting channel 12 is placed around the lower rail, the workers can tighten the left hand-twist bolt 28 and the right hand-twist bolt 29 to further secure the present invention to the platform lift. More specifically, when heads of the left hand-twist bolt 28 and the right hand-twist bolt 29 are twisted, shafts of the left hand-twist bolt 28 and the right hand-twist bolt 29 traverse through the first channel wall 9 and enter into the channel opening of the adjustable mounting channel 12. Then the shafts can narrow the gap between the channel opening of the adjustable mounting channel 12 thus clamping the second channel wall 10 of the adjustable mounting channel 12 against the safety rail of the platform lift.

Although the invention has been explained in relation to its preferred embodiment, it is to be understood that many other possible modifications and variations can be made without departing from the spirit and scope of the invention as hereinafter claimed.

What is claimed is:

1. An adjustable platform work tray comprising:
a storage platform;
a fixed mounting channel;
an adjustable mounting channel;
a support frame;
an adjustable brace;
the storage platform comprising a base and a side wall;
the side wall being perimetrically connected around the base;
the fixed mounting channel being laterally mounted along a first wall section of the side wall;
the support frame being perpendicularly mounted to the base, opposite of the side wall;
the support frame being positioned adjacent to the first wall section;
the adjustable mounting channel being slidably mounted to the support frame;
the adjustable mounting channel and the fixed mounting channel being positioned coplanar to each other;
the adjustable brace being rotatably engaged in between the base and the adjustable mounting channel;
the adjustable mounting channel comprising
a first channel wall, a second channel wall, a channel base, a left bracket, and a right bracket;
the first channel wall of the adjustable mounting channel being positioned adjacent to the support frame;
the first channel wall of the adjustable mounting channel being slidably mounted to a left support of the support frame by the left bracket;
the first channel wall of the adjustable mounting channel being slidably mounted to a right support of the support frame by the right bracket;
the channel base of the adjustable mounting channel being positioned parallel to the base of the storage platform;
the channel base of the adjustable mounting channel being oriented toward the fixed mounting channel; and
the second channel wall of the adjustable mounting channel being positioned offset from the left bracket and the right bracket.

2. The adjustable platform work tray as claimed in claim 1 comprising:
the side wall further comprising a second wall section, a third wall section, and a fourth wall section;
the first wall section being perpendicularly connected to the base;
the second wall section being adjacently connected to the base;
the second wall section being oppositely positioned of the first wall section about the base;
the third wall section and the fourth wall section being oppositely positioned of each other about the base;
the third wall section being adjacently connected to the base, the first wall section, and the second wall section; and the fourth wall section being adjacently connected to the base, the first wall section, and the second wall section.

3. The adjustable platform work tray as claimed in claim 1 comprising:
the support frame comprising a left support, a right support, and a cross support;
the left support and the first wall section being oppositely oriented of each other about the base;
the right support and the first wall section being oppositely oriented of each other about the base;
the left support being terminally mounted to the base of the storage platform;
the right support being terminally mounted to the base of the storage platform; and
the cross support being terminally mounted to the left support and the right support.

4. The adjustable platform work tray as claimed in claim 1 comprising:
the fixed mounting channel and the adjustable mounting channel both comprising a first channel wall, a second channel wall, and a channel base;
the first channel wall and the second channel wall being oppositely positioned of each other about the channel base;
the first channel wall being perpendicularly connected to the channel base; and
the second channel wall being perpendicularly connected to the channel base.

5. The adjustable platform work tray as claimed in claim 1 comprising:
the fixed mounting channel comprising a first channel wall, a second channel wall, and a channel base;
the first channel wall of the fixed mounting channel being mounted along the first wall section;
the channel base of the fixed mounting channel being positioned parallel to the base of the storage platform;
the channel base of the fixed mounting channel and the base of the storage platform being oppositely positioned of each other about the first channel wall of the fixed mounting channel; and
the second channel wall of the fixed mounting channel being positioned offset from the first wall section.

6. The adjustable platform work tray as claimed in claim 1 comprising:
the adjustable brace comprising a tubular body, a retractable body, a locking mechanism;
the retractable body being telescopically engaged within the tubular body;
a platform end of the tubular body being rotatably mounted to the base of the storage platform;
a channel end of the retractable body being rotatably mounted to a first channel wall of the adjustable mounting channel; and
the locking mechanism being externally integrated into the tubular body and the retractable body.

7. The adjustable platform work tray as claimed in claim 1 comprising:
a left hand-twist bolt;
a right hand-twist bolt;
the adjustable mounting channel comprising a first channel wall, a left bracket, and a right bracket;
the left hand-twist bolt being threadedly engaged with the left bracket and the first channel wall; and
the right hand-twist bolt being threadedly engaged with the right bracket and the first channel wall.

8. An adjustable platform work tray comprising:
a storage platform;

a fixed mounting channel;
an adjustable mounting channel;
a support frame;
an adjustable brace;
the storage platform comprising a base and a side wall;
the fixed mounting channel and the adjustable mounting channel each comprising a first channel wall, a second channel wall, and a channel base;
the side wall being perimetrically connected around the base;
the first channel wall and the second channel wall being oppositely positioned of each other about the channel base;
the first channel wall being perpendicularly connected to the channel base;
the second channel wall being perpendicularly connected to the channel base;
the fixed mounting channel being laterally mounted along a first wall section of the side wall;
the support frame being perpendicularly mounted to the base, opposite of the side wall;
the support frame being positioned adjacent to the first wall section;
the adjustable mounting channel being slidably mounted to the support frame;
the adjustable mounting channel and the fixed mounting channel being positioned coplanar to each other;
the adjustable brace being rotatably engaged in between the base and the adjustable mounting channel;
the adjustable mounting channel further comprising a left bracket and a right bracket;
the first channel wall of the adjustable mounting channel being positioned adjacent to the support frame;
the first channel wall of the adjustable mounting channel being slidably mounted to a left support of the support frame by the left bracket;
the first channel wall of the adjustable mounting channel being slidably mounted to a right support of the support frame by the right bracket;
the channel base of the adjustable mounting channel being positioned parallel to the base of the storage platform;
the channel base of the adjustable mounting channel being oriented toward the fixed mounting channel; and
the second channel wall of the adjustable mounting channel being positioned offset from the left bracket and the right bracket.

9. The adjustable platform work tray as claimed in claim 8 comprising:
the side wall further comprising a second wall section, a third wall section, and a fourth wall section;
the first wall section being perpendicularly connected to the base;
the second wall section being adjacently connected to the base;
the second wall section being oppositely positioned of the first wall section about the base;
the third wall section and the fourth wall section being oppositely positioned of each other about the base;
the third wall section being adjacently connected to the base, the first wall section, and the second wall section; and
the fourth wall section being adjacently connected to the base, the first wall section, and the second wall section.

10. The adjustable platform work tray as claimed in claim 8 comprising:
the support frame comprising a left support, a right support, and a cross support;
the left support and the first wall section being oppositely oriented of each other about the base;
the right support and the first wall section being oppositely oriented of each other about the base;
the left support being terminally mounted to the base of the storage platform;
the right support being terminally mounted to the base of the storage platform; and
the cross support being terminally mounted to the left support and the right support.

11. The adjustable platform work tray as claimed in claim 8 comprising:
the first channel wall of the fixed mounting channel being mounted along the first wall section;
the channel base of the fixed mounting channel being positioned parallel to the base of the storage platform;
the channel base of the fixed mounting channel and the base of the storage platform being oppositely positioned of each other about the first channel wall of the fixed mounting channel; and
the second channel wall of the fixed mounting channel being positioned offset from the first wall section.

12. The adjustable platform work tray as claimed in claim 8 comprising:
the adjustable brace comprising a tubular body, a retractable body, a locking mechanism;
the retractable body being telescopically engaged within the tubular body;
a platform end of the tubular body being rotatably mounted to the base of the storage platform;
a channel end of the retractable body being rotatably mounted to a first channel wall of the adjustable mounting channel; and
the locking mechanism being externally integrated into the tubular body and the retractable body.

13. The adjustable platform work tray as claimed in claim 8 comprising:
a left hand-twist bolt;
a right hand-twist bolt;
the adjustable mounting channel comprising a left bracket and a right bracket;
the left hand-twist bolt being threadedly engaged with the left bracket and the first channel wall; and
the right hand-twist bolt being threadedly engaged with the right bracket and the first channel wall.

* * * * *